US011235682B2

(12) United States Patent
Shiraishi et al.

(10) Patent No.: US 11,235,682 B2
(45) Date of Patent: Feb. 1, 2022

(54) POWER SUPPLY DEVICE FOR VEHICLE

(71) Applicant: GS Yuasa International Ltd., Kyoto (JP)

(72) Inventors: Takeyuki Shiraishi, Kyoto (JP); Takeshi Nakamoto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 120 days.

(21) Appl. No.: 15/723,997

(22) Filed: Oct. 3, 2017

(65) Prior Publication Data

US 2018/0093581 A1 Apr. 5, 2018

(30) Foreign Application Priority Data

Oct. 4, 2016 (JP) .................... 2016-196273

(51) Int. Cl.
*H01M 2/10* (2006.01)
*H01M 4/58* (2010.01)
(Continued)

(52) U.S. Cl.
CPC ............. *B60L 58/21* (2019.02); *H01M 4/587* (2013.01); *H01M 4/5825* (2013.01); *H01M 10/0525* (2013.01); *H01M 10/4207* (2013.01); *H01M 10/482* (2013.01); *H01M 50/20* (2021.01); *H02J 7/0021* (2013.01); *H02J 7/0031* (2013.01); *B60L 2240/36* (2013.01); *H01M 10/486* (2013.01); *H01M 2010/4271* (2013.01); *H01M 2220/20* (2013.01); *Y02E 60/10* (2013.01); *Y02T 10/70* (2013.01)

(58) Field of Classification Search
CPC .. H01M 2/1077; H01M 4/5825; H01M 4/587; H01M 10/0525; H01M 10/486
See application file for complete search history.

(56) References Cited

U.S. PATENT DOCUMENTS 5,986,431 A * 11/1999 Hayes ................... H02J 7/1423
320/112
9,197,080 B2 11/2015 Shiraishi
(Continued)

FOREIGN PATENT DOCUMENTS

| JP | 2004-025979 A | 1/2004 |
| JP | 2011-078147 A | 4/2011 |

(Continued)

*Primary Examiner* — Osei K Amponsah
(74) *Attorney, Agent, or Firm* — Alston & Bird LLP (57) ABSTRACT

A power supply device for a vehicle includes: a first energy storage device having a first energy storage element; a second energy storage device having a second energy storage element; a switch which switches between a state in which the first energy storage device and the second energy storage device are connected in parallel and a state in which the first energy storage device and the second energy storage device are separated from each other; and a switch controller. Each of the first energy storage element and the second energy storage element is an energy storage element having an SOC-OCV characteristic having a flat region thereon, and the switch controller switches the switch from an off-state to an on-state when each of the first energy storage element and the second energy storage element is in the flat region of the SOC-OCV characteristic.

10 Claims, 6 Drawing Sheets

(51) Int. Cl.
*H01M 4/587* (2010.01)
*H01M 10/48* (2006.01)
*H01M 10/0525* (2010.01)
*B60L 58/21* (2019.01)
*H02J 7/00* (2006.01)
*H01M 10/42* (2006.01)
*H01M 50/20* (2021.01)

(56) References Cited

U.S. PATENT DOCUMENTS

| | | |
|---|---|---|
| 9,722,436 B2 | 8/2017 | Shiraishi |
| 2011/0001352 A1 | 1/2011 | Tamura et al. |
| 2011/0305933 A1* | 12/2011 | Huang ................ H01M 2/1022 |
| | | 429/97 |
| 2012/0065824 A1* | 3/2012 | Takahashi ............. H02J 7/0021 |
| | | 701/22 |
| 2015/0275841 A1 | 10/2015 | Sakata et al. |

FOREIGN PATENT DOCUMENTS

| | | | | |
|---|---|---|---|---|
| JP | 2013-070599 A | | 4/2013 | |
| JP | 2014-184752 A | | 10/2014 | |
| JP | 2015-012681 | * | 1/2015 | ............ H01M 10/44 |
| JP | 2015-067042 A | | 4/2015 | |
| JP | 2015-109741 A | | 6/2015 | |
| JP | 2015-118060 | * | 6/2015 | ............ H01M 10/48 |
| JP | 2015-198560 A | | 11/2015 | |
| WO | WO 2014/068920 A1 | | 5/2014 | |
| WO | WO 2015/189902 A1 | | 12/2015 | |

* cited by examiner

|  |  | FIRST SWITCH SW1 |
|---|---|---|
| WHILE ENGINE IS STOPPED | | OFF |
| WHEN ENGINE IS STARTED | LOW TEMPERATURES (T < X) | ON |
| | NORMAL TEMPERATURES (T ≥ X) | OFF |
| WHILE TRAVELING | | ON |

POWER SUPPLY DEVICE FOR VEHICLE

CROSS REFERENCE TO RELATED APPLICATIONS

This application claims priority to and the benefit of Japanese Patent Application No. 2016-196273, filed on Oct. 4, 2016, the entire contents of which as are hereby incorporated by reference.

BACKGROUND

Related Field

The present invention relates to a power supply device for a vehicle.

Description of Related Art

Currently, automatic braking systems and automatic driving systems are being actively developed by automobile manufacturers. Such a trend of electrification of vehicles highly increases the importance of power supply device for a vehicle. It is still typical that a single lead-acid battery and an alternator are used as a power source for a vehicle to supply power. In such a conventional configuration, a vehicle may lose a power source when the battery suddenly dies or when a terminal for supplying power comes off; therefore, dual power supply configuration batteries may be used in order to provide redundancy. JP 2015-67042 A describes a configuration in which a vehicle power supply device includes a control device, an electric load, a main relay, a starter, an alternator, a lead-acid battery, a nickel-metal hydride rechargeable battery, and the like.

If the batteries are used in a dual power supply configuration, it is desirable that the connections of two batteries be changed by using a switch to increase the degree of freedom of the combination of the two batteries. If the switch is closed in the state that there is a voltage difference between the two batteries due to an SOC difference, a large current may flow through the switch; therefore, a measure is required to address this issue.

BRIEF SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the invention is to prevent a large current from flowing through the switch when the switch is switched, by reducing the voltage difference between the batteries and, at the same time, giving the power supply device redundancy.

A power supply device for a vehicle according to an aspect of the present invention includes: a first energy storage device having a first energy storage element; a second energy storage device having a second energy storage element; a switch which switches between a state in which the first energy storage device and the second energy storage device are connected in parallel and a state in which the first energy storage device and the second energy storage device are separated from each other; and a switch controller. Each of the first energy storage element and the second energy storage element is an energy storage element having an SOC-OCV characteristic having a flat region thereon, and the switch controller switches the switch from an off-state to an on-state when each of the first energy storage element and the second energy storage element is in the flat region of the SOC-OCV characteristic.

BRIEF DESCRIPTION OF THE FIGURES

The foregoing and other features of the present invention will become apparent from the following description and drawings of an illustrative embodiment of the invention in which.

DETAILED DESCRIPTION OF VARIOUS EMBODIMENTS

A power supply device for a vehicle according to an aspect of the present invention includes: a first energy storage device having a first energy storage element; a second energy storage device having a second energy storage element; a switch which switches between a state in which the first energy storage device and the second energy storage device are connected in parallel and a state in which the first energy storage device and the second energy storage device are separated from each other; and a switch controller. Each of the first energy storage element and the second energy storage element is an energy storage element having an SOC-OCV characteristic having a flat region thereon, and the switch controller switches the switch from an off-state to an on-state when each of the first energy storage element and the second energy storage element is in the flat region of the SOC-OCV characteristic.

With this configuration, even if there is an SOC difference between the two energy storage devices, the voltage difference between the two energy storage devices is small when each of the SOCs is in a plateau region. Therefore, it is possible to prevent a large current from flowing through the switch when the switch is switched.

The first energy storage device may be connected to an engine starter device, and if a predetermined condition is satisfied at a time of engine start, the switch controller may turn on the switch to connect the first energy storage device and the second energy storage device in parallel. In this configuration, if the predetermined condition is satisfied, the two energy storage devices are connected in parallel; therefore, the energy storage devices share a cranking current necessary to start the engine. Thus, startability of the engine is improved compared to the case that the cranking current is bared only by the first energy storage device, and the startability can be secured at the same level as at a normal time. The predetermined condition may be that the startability of the engine is easily lowered only with the first energy storage device. Specifically, the predetermined condition may be that a temperature of the first energy storage element is lower than a threshold, that an internal resistance of the first energy storage element is greater than a threshold, or that a voltage value of the first energy storage element is lower than a threshold.

The second energy storage device may be connected to an electric load different from the engine starter device; and if the predetermined condition is not satisfied at a time of engine start, the switch controller may turn off the switch to separate the first energy storage device and the second energy storage device from each other. This configuration can reduce the fluctuation of the voltage of the second energy storage device associated with the start of the engine, whereby power can be stably supplied to the electric load.

A type of a positive active material of the first energy storage element and a type of a positive active material of the second energy storage element may be identical, and a type of a negative active material of the first energy storage element and a type of a negative active material of the second energy storage element may be identical. In this configuration, the SOC-OCV characteristics of the first energy storage element and the second energy storage element are substantially identical. Therefore, a voltage difference between the two energy storage devices is less likely to be generated than in a case that energy storage elements having different characteristics are used in combination.

The positive active material may comprise lithium iron phosphate, and the negative active material may comprise graphite. In the case that the positive active material is lithium iron phosphate, a cell voltage (OCV) is approximately 3.3 V, and the voltage of four cells connected in series is 13.4 V; therefore, there will be provided good voltage matching with electric equipment for a vehicle (12 volt system). Further, if a negative active material is graphite, the energy density is high, and the number of cells can be advantageously reduced. An iron phosphate based lithium ion secondary battery has a large plateau region, and a range of use overlaps with the plateau region. Therefore, when used in the range of use, the switch can be switched at any time.

The first energy storage device and the second energy storage device may have different actual capacities. When two energy storage devices having different actual capacities are used while being separated from each other, there is generated a voltage difference between the two energy storage devices in some cases. By applying the present technology to such a power supply device, it is possible to reduce the voltage difference between the two energy storage devices; therefore, the switch can be switched at any time without considering the voltage difference.

An Embodiment

An embodiment of the present invention will be described with reference to FIG. 1 to FIG. 5.

1. The Description of a Power Supply Device S for a Vehicle

Figure 1:
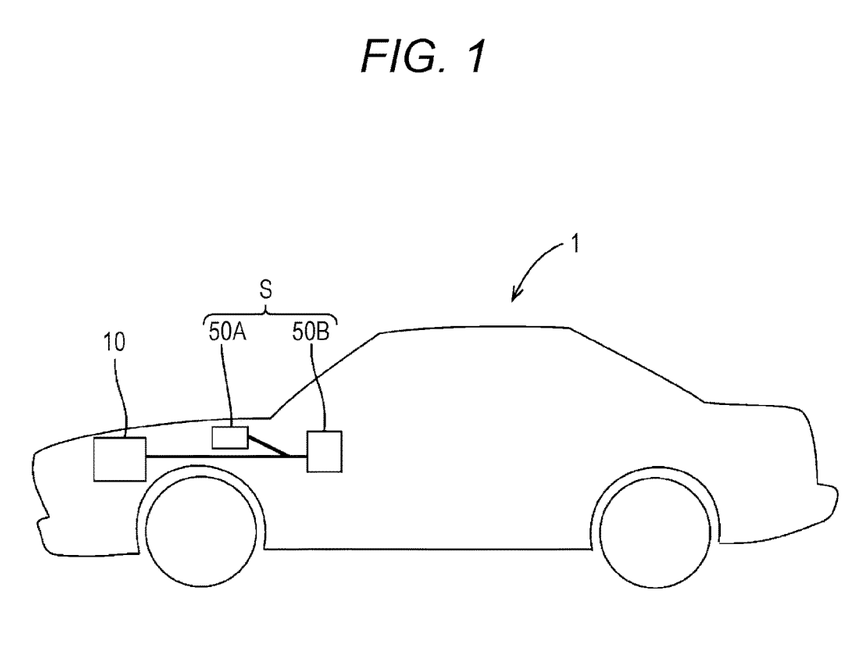
FIG. 1 is a side view of a vehicle applied to an embodiment.

As shown in FIG. 1, a vehicle 1 is equipped with an engine starter device 10 such as a starter motor and a power supply device S. Note that although not shown in FIG. 1, the vehicle 1 is equipped with an alternator 20 and an electric load 30 in addition to the engine starter device 10. As the electric load 30, there can be exemplified an air conditioner, an audio system, a car navigation system, and the like.

Figure 2:
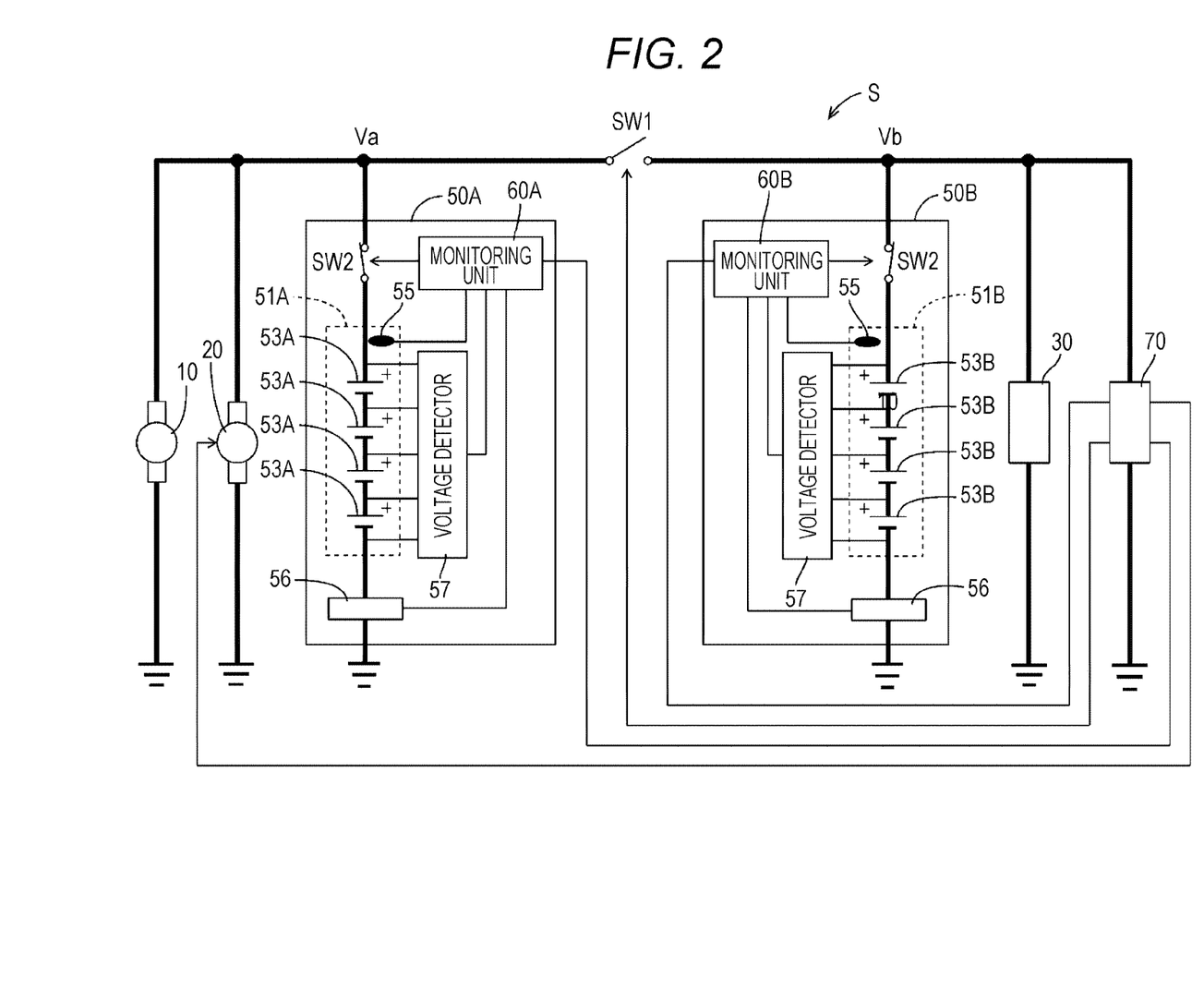
FIG. 2 is a block diagram showing an electrical configuration of a power supply device.

FIG. 2 is a block diagram showing an electrical configuration of a power supply device for a vehicle.

The power supply device S includes a first battery 50A, a second battery 50B, a first switch SW1, and a vehicle ECU 70. As shown in FIG. 2, to the first battery 50A are connected the engine starter device 10 and the alternator 20, and to the second battery 50B are connected the electric load 30 and the vehicle electronic control unit (ECU) 70. Note that the first battery 50A is an example of a "first energy storage device", and the second battery 50B is an example of a "second energy storage device". The first switch SW1 is an example of a "switch", and the vehicle ECU 70 is an example of a "switch controller".

The first switch SW1 is provided on an electric wire L connecting a positive electrode of the first battery 50A and a positive electrode of the second battery 50B. When the first switch SW1 is turned off (open circuit), the first battery 50A and the second battery 50B get separated from each other. When the first switch SW1 is turned on (closed circuit), the first battery 50A and the second battery 50B get connected in parallel.

As shown in FIG. 2, the first battery 50A includes an assembled battery 51A, a second switch SW2, a temperature sensor 55, a current sensor 56 as a current measurement unit, a voltage detector 57, and a monitoring unit 60A. The assembled battery 51A is configured with a plurality (for example, four) of series-connected secondary batteries 53A. The secondary batteries 53A are an example of a "first energy storage element".

The temperature sensor 55 is of a contact type or a non-contact type and has a function to measure a temperature T (° C.) of the assembled battery 51. The current sensor 56 has a function to detect a current I flowing through the assembled battery 51A. The voltage detector 57 is connected to each end of the secondary batteries 53A through detection lines and has a function to measure voltages of the respective secondary batteries 53A and a total voltage Va of the assembled battery 51A. The second switch SW2 is disposed on the positive electrode side of the assembled battery 51A.

The monitoring unit 60A monitors the states of the first battery 50A from the outputs of the temperature sensor 55, the current sensor 56, and the voltage detector 57. That is, the monitoring unit 60A monitors the temperature T, the current I, and the total voltage V of the assembled battery 51A as well as the voltages of the respective secondary batteries 53A. When there is abnormality in the assembled battery 51A, the monitoring unit 60A turns off the second switch SW2 to cut off the current flowing through the assembled battery 51A.

The second battery 50B includes an assembled battery 51B, a second switch SW2, a temperature sensor 55, a current sensor 56, a voltage detector 57, and a monitoring unit 60B and has the identical configuration as the first battery 50A. Note that the assembled battery 51B of the second battery 50B also has a plurality of (for example, four) series-connected secondary batteries 53B in the same way as the first battery 50A, and the number of the cells of the second battery 50B is equal to the number of the cells of the first battery 50A. The secondary batteries 53B are an example of a "second energy storage element".

The vehicle ECU 70 controls equipment of a power supply system installed in the vehicle. Specifically, the vehicle ECU 70 is communicably connected to the monitoring unit 60A of the first battery 50A and the monitoring unit 60B of the second battery 50B and receives from the monitoring units 60A and 60B data about the states of the batteries 50A and 50B, specifically, the data about the temperatures, the currents, the total voltages, and the SOCs of the assembled batteries 51A and 51B, at a constant cycle.

In addition, the vehicle ECU 70 is communicably connected to the alternator 20 and performs charge control of the batteries 50A and 50B by controlling an output of the alternator 20, depending on the states of the batteries 50A and 50B.

Further, the vehicle ECU 70 is communicably connected to another vehicle ECU (not shown) for controlling a driving system such as an engine and obtains information on the state of the vehicle from another vehicle ECU. Then, the vehicle ECU 70 performs control such that the first switch SW1 is switched to either an on-state (closed circuit) or an off-state (open circuit), by sending an instruction to the first switch SW1 of the power supply device S on the basis of the state of the vehicle.

Figure 3:
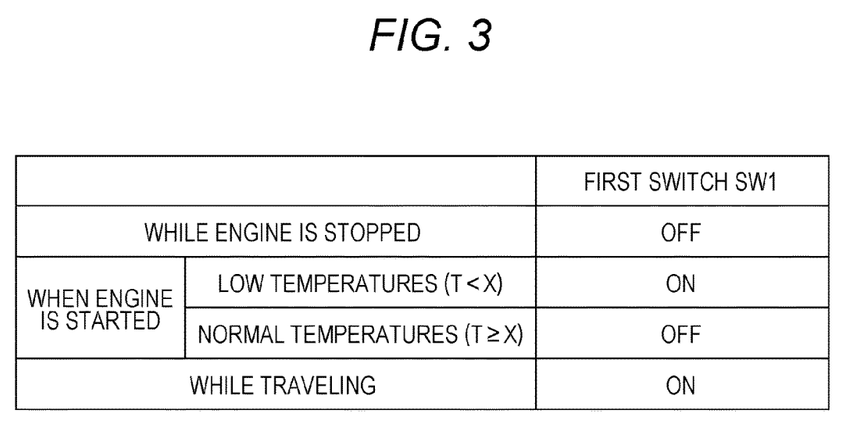
FIG. 3 is a table showing a pattern of switching on and off of a first switch.

Specifically, as shown in FIG. 3, control is performed such that the first switch SW1 is an off-state while the engine is stopped and such that the first switch SW1 is in an on-state while traveling. By performing control such that the first switch SW1 is put in an on-state while traveling, the two batteries 50A and 50B get connected in a parallel. Therefore, for example, even if a terminal connected to a post of either of the batteries 50A and 50B comes off due to vibration while traveling or other causes, the other battery can maintain power supply, and the power source can have redundancy.

2. The SOC-OCV Characteristic

All of the secondary batteries 53A of the first battery 50A and the secondary batteries 53B of the second battery 50B are iron phosphate based lithium ion batteries in which lithium iron phosphate (LiFePO4) is used for the positive active material and graphite is used for the negative active material.

Figure 4:
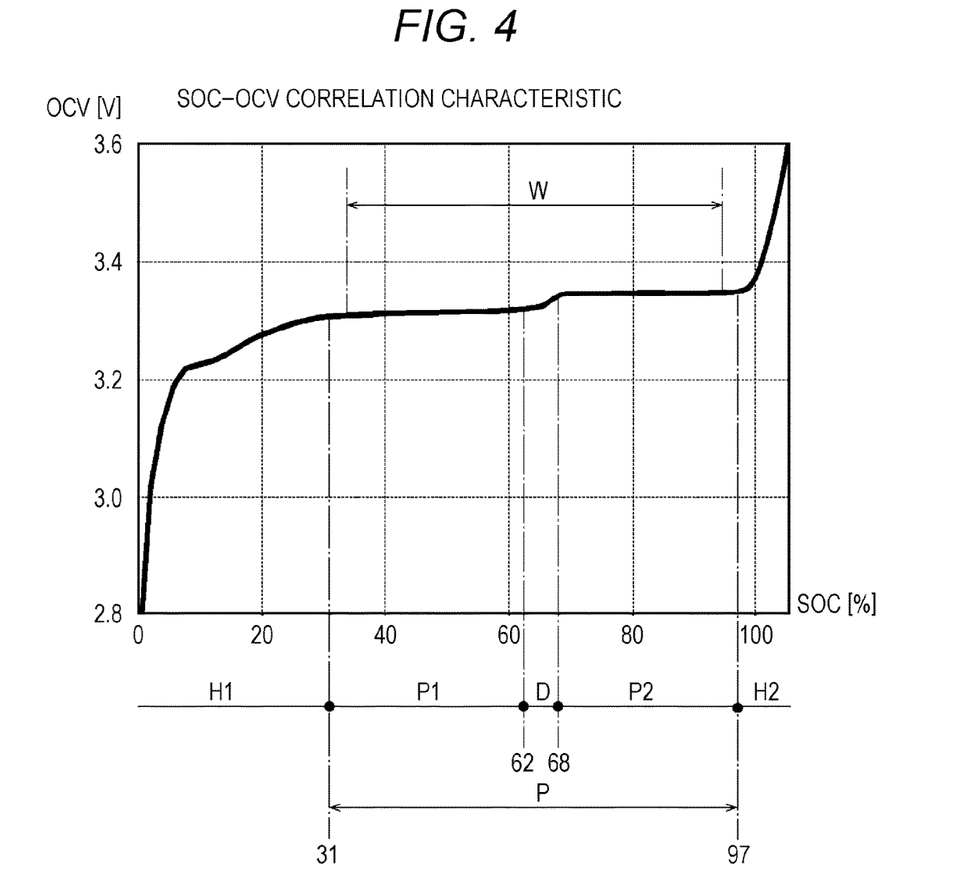
FIG. 4 is a graph showing an SOC-OCV characteristic of a secondary battery.

FIG. 4 is an SOC-OCV correlation characteristic of each of the lithium ion secondary batteries 53A and 53B, where the horizontal axis represents an SOC [%], and the vertical axis represents an OCV [V]. Note that the SOC (State Of Charge) is a ratio of a residual capacity to a full charge capacity. Further, the OCV (Open Circuit Voltage) is an open voltage of each of the secondary battery 53A and 53B.

Regarding the iron phosphate based lithium ion secondary batteries 53A and 53B, as shown in FIG. 4, the SOC-OCV correlation characteristic has a flat region (hereinafter, referred to as a plateau region P) in which the amount of change in the OCV is so small with respect to the amount of change in the SOC that the OCV is approximately constant. Note that the plateau region P is a region in which the amount of change in the OCV with respect to the amount of change in the SOC is equal to or less than 2 mV/%.

Specifically, the plateau region P is in the range from 31[%] to 97[%] in the value of the SOC. The plateau region P includes a first plateau region P1 in which the OCV is approximately constant 3.3 V and a second plateau region P2 at which the OCV is approximately constant 3.34 V, and the plateau region P has a step region D having a larger change in the OCV between the two plateau regions P1 and P2.

In addition, each of the iron phosphate based lithium ion secondary batteries 53A and 53B has two large change regions H1 and H2 on the SOC-OCV correlation characteristic. The first large change region H1 is in the range lower than 31[%] in the value of the SOC and is on the lower SOC side of the plateau region P1. The second large change region H2 is in the range larger than 97[%] in the value of the SOC and is on the higher SOC side of the plateau region P2. Each of the large change regions H1 and H2 has a relatively higher amount of change in the OCV (the gradation of the graph shown in FIG. 4) with respect to the amount of change in the SOC than the plateau regions P1 and P2.

Further, in the present example, a use range W of each of the lithium ion secondary batteries 53A and 53B is set to be, for example, 35[%] to 95[%] in the SOC, and the whole of the use range W therefore overlaps with the plateau region P. The OCV is approximately constant in the plateau region P; therefore, even when there is an SOC difference between the two batteries 50A and 50B, a voltage difference Va–Vb between the two batteries is small. Thus, in the use range W, it is possible to prevent a large current due to the voltage difference Va–Vb from flowing between the batteries when the first switch SW1 is switched from an off-state to an on-state.

Note that the OCV of the first plateau region P1 is 3.3 V and the OCV of the second plateau region is 3.34 V, which means there is a voltage difference of the OCV between the two plateau regions P1 and P2. However, the voltage difference of the OCV is only about 0.04 V. Therefore, even if the first switch SW1 is switched from an off-state to an on-state when the two batteries 50A and 50B are in the different plateau regions P1 and P2, it is possible to reduce a lateral current (the current flowing between the batteries) due to the voltage difference Va–Vb. Thus, it is possible to prevent an overcurrent from flowing through the first switch SW1.

Further, the first battery 50A has an actual capacity of 40 Ah, and the second battery 50B has an actual capacity of 20 Ah; thus, there is a difference in capacity. The total capacity of the two batteries 50A and 50B is 60 Ah and is equal to the actual capacity of 60 Ah of a general-purpose lead-acid battery (not shown in the drawing) for starting the engine. Note that the term "actual capacity" is a capacity which can be taken out from a battery when the battery is fully charged.

3. Switching Control of the First Switch SW1 When the Engine is Started

Figure 5:
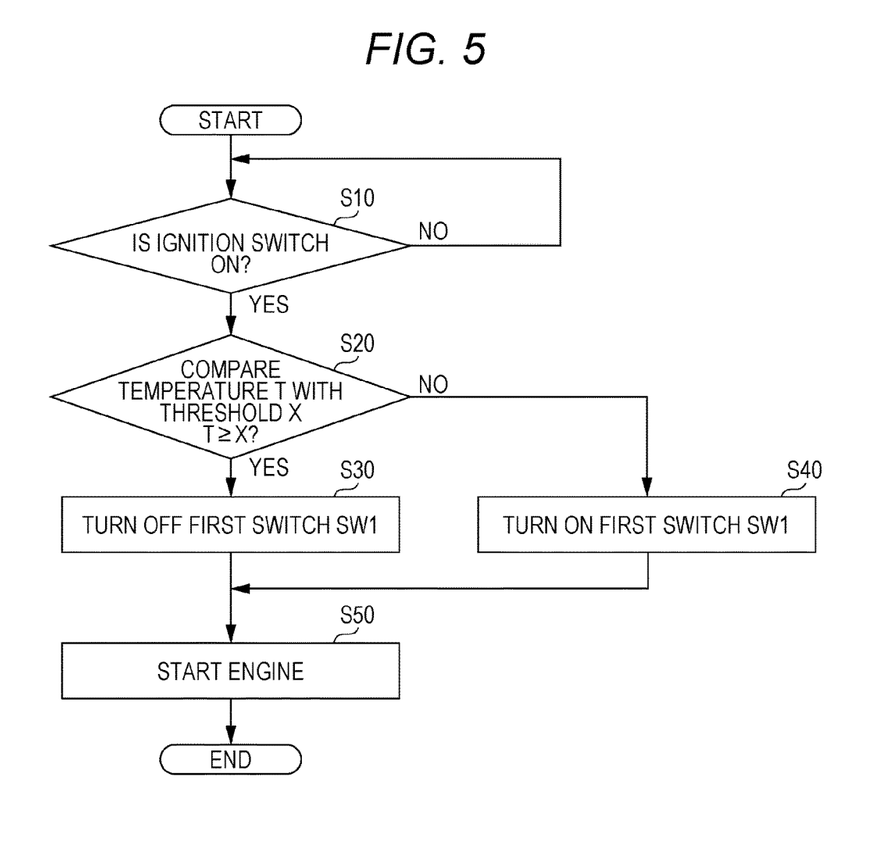
FIG. 5 is a flowchart showing switching control of the first switch at a time of engine start.

The vehicle ECU 70 switches the first switch SW1 between an on-state and an off-state on the basis of the temperature T of the first battery 50A at a time of engine start. Specifically, as shown in FIG. 5, the vehicle ECU 70 performs a process for detecting the state of an ignition switch (step S10).

If the vehicle ECU 70 detects an on-state of the ignition switch, the vehicle ECU 70 performs a process for comparing the temperature T of the assembled battery 51A of the first battery 50A with a threshold X (step S20). Note that the threshold X is used to determine whether the first battery 50A is in a low temperature state or not, and an example of the threshold X is 0° C.

If the temperature T of the assembled battery 51A of the first battery 50A is equal to or higher than the threshold X, in other words, if the first battery 50A is not at low temperatures, the vehicle ECU 70 gives an instruction to the first switch SW1 so as to perform control such that the first switch SW1 is put in an off-state (open circuit) (step S30). By this operation, only the first battery 50A gets connected to the engine starter device 10, and when the first battery 50A is not at low temperatures, the engine starter device 10 operates with a cranking current supplied from the first battery 50A (step S50). As described above, the first switch SW1 is turned off to separate the second battery 50B from the engine starter device 10 in the case that the first battery 50A is not at low temperatures. Therefore, it is possible to reduce the fluctuation of the voltage of the second battery 50B associated with engine start, whereby power can be stably supplied to the electric load 30 and the vehicle ECU 70.

Note that the capacity of the first battery 50A is 40 Ah, which is smaller than the capacity of a general-purpose lead-acid battery. However, the lithium ion secondary battery has a low internal resistance; therefore, the lithium ion secondary battery can discharge the cranking current necessary to start the engine, whereby the engine can start only with the first battery 50A.

On the other hand, if the temperature T of the assembled battery 51A of the first battery 50A is lower than the threshold X, in other words, if the first battery 50A is at low temperatures, the vehicle ECU 70 gives an instruction to the first switch SW1 so as to perform control such that the first switch SW1 is put in an on-state (closed circuit) (step S40). By this operation, the two batteries 50A and 50B get connected in parallel to the engine starter device 10. Thus, the engine starter device 10 operates with a cranking current supplied from the two batteries 50A and 50B (step S50).

The internal resistance of the lithium ion secondary battery is high in a low temperature state; therefore, the startability of the engine may be lowered only with the first battery 50A. However, with the present embodiment, the two batteries 50A and 50B are connected in parallel to share the cranking current necessary to start the engine. Therefore, the startability of the engine is improved compared to the case that only the first battery 50A bares the cranking current, and even when the temperature is low, the startability is maintained at the same level as when the temperature is normal.

4. The Description of Effects

In the power supply device S of the present embodiment, the first battery 50A and the second battery 50B are the lithium ion secondary batteries 53A and 53B, which are both iron phosphate based batteries and each of which has the plateau region P on the SOC-OCV characteristic. In the plateau region P, even when there is an SOC difference between the two batteries, the voltage difference Va–Vb between the two batteries is small. Therefore, it is possible to prevent a large current (lateral current) caused by the voltage difference Va–Vb between the batteries from flowing through the first switch SW1 when the first switch SW1 is turned on from off. Note that the lateral current means a current flowing between the two batteries due to the voltage difference Va–Vb.

When the engine is started in the low temperature state (T<X), the vehicle ECU 70 turns on the first switch SW1 to connect the two batteries 50A and 50B in parallel, so that the two batteries 50A and 50B share the cranking current necessary to start the engine. Thus, startability of the engine is improved compared to the case that the cranking current is bared only by the first battery 50A, and the startability can be secured at the same level as at a normal temperature environment.

When the engine is started in the state other than low temperatures (T≥X), the vehicle ECU 70 turns off the first switch SW1 to separate the second battery 50B from the engine starter device 10. Therefore, it is possible to reduce the fluctuation of the voltage of the second battery 50B associated with engine start, whereby power having small voltage fluctuation can be stably supplied to the electric load 30 and the vehicle ECU 70.

In the power supply device S of the present embodiment, the first battery 50A has an actual capacity of 40 Ah, the second battery 50B has an actual capacity of 20 Ah, and the two batteries 50A and 50B have different actual capacities. When the two batteries 50A and 50B having different actual capacities are used while being separated from each other, there is generated a voltage difference Va–Vb between the two energy storage devices in some cases. By applying the present technology (technology in which "elements each having a flat region on an SOC-OCV characteristic" is used as energy storage elements constituting batteries) to the power supply device S, in which the batteries 50A and 50B having different actual capacities are combined, it is possible to reduce the voltage difference Va–Vb between the two batteries. Therefore, it is possible to switch the first switch SW1 at any time without considering the voltage difference Va–Vb.

Other Embodiments

The present invention is not limited to the embodiment described in the above description and drawings, and, for example, the following embodiments are also included in the technical scope of the present invention.

(1) The present embodiment shows an example in which the batteries 50A and 50B are configured with the assembled batteries 51A and 51B; however, the batteries 50A and 50B may be each configured with a single cell. For example, the batteries 50A and 50B may be configured with a single lithium ion secondary battery 53A and a single lithium ion secondary battery 53B, respectively.

(2) In the present embodiment, as the active materials of the lithium ion secondary batteries 53A and 53B, lithium iron phosphate is used for the positive electrodes, and graphite is used for the negative electrodes. The lithium ion secondary batteries 53A and 53B have only to be energy storage elements each having a flat region (plateau region) on an SOC-OCV characteristic, and the types of the active materials are not limited to the examples in the embodiment. For example, the positive active material may be lithium manganese oxide, and the negative active material may be lithium titanate. Note that if an energy storage element other than a lithium ion secondary battery, which has a flat region on an SOC-OCV characteristic may be used.

(3) If types of the positive active materials and types of the negative active materials are each identical between the lithium ion secondary batteries 53A and the lithium ion secondary batteries 53B, the SOC-OCV characteristics are approximately identical, and the voltage difference is not likely to occur. Therefore, it is preferable that each of the types of the positive active materials and the types of the negative active materials be made identical between the lithium ion secondary batteries 53A and the lithium ion secondary batteries 53B. Note that, regarding the types of the active materials, either of lithium iron phosphate and lithium manganese oxide may be chosen for the positive electrode, and either of graphite and lithium titanate may be chosen for the negative electrode.

(4) The present embodiment shows an example in which the whole of the use range W of each of the batteries 50A and 50B overlaps with the plateau region P; however, at least part of the use range W of each of the batteries 50A and 50B may overlap with the plateau region P. In this case, it is preferable that the SOC value of each of the batteries 50A and 50B be obtained by a current integration method or other methods and that the first switch SW1 be switched when the two batteries 50A and 50B are both included in the plateau regions P.

Figure 6:
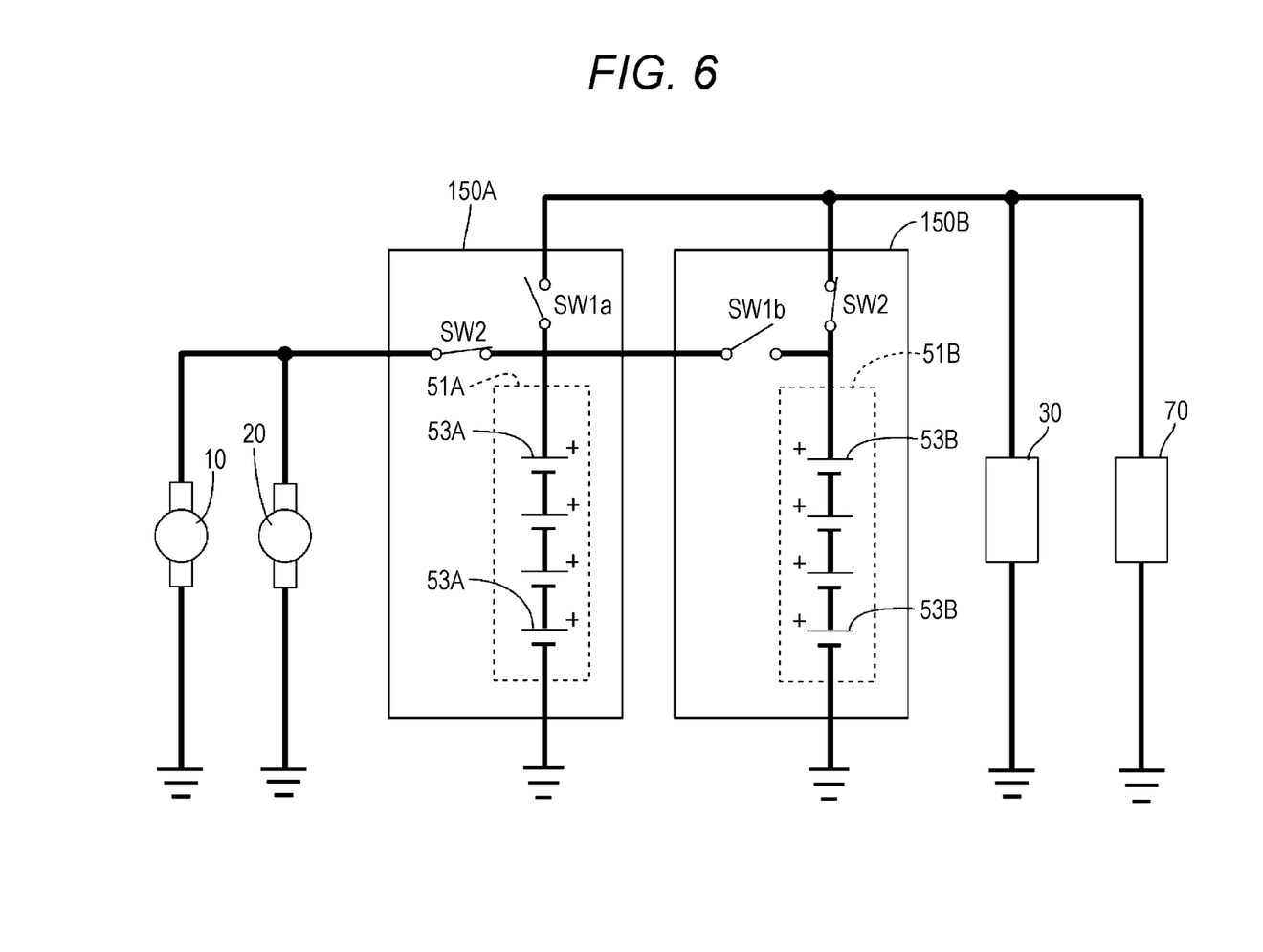
FIG. 6 is a block diagram showing another embodiment of a power supply device

(5) In the present embodiment, the first switch SW1 is provided outside the battery; however, the first switch SW1 may be built in the battery as shown in FIG. 6. Note that, with reference to FIG. 6, a switch SW1a built in a battery 150A and a switch SW1b built in a battery 150B have the function of the first switch SW1 of FIG. 1.

(6) The present embodiment shows the vehicle ECU 70 as an example of the switch controller; however, a switch controller for exclusive use may be provided separately from the vehicle ECU 70. Alternatively, the monitoring unit 60A of the first battery 50A or the monitoring unit 60B of the second battery 50B may be made to bear the function of the switch controller.

(7) In the present embodiment, the threshold X is 0° C.; however, the threshold X may be other temperature than 0° C.

(8) In the present embodiment, if the first battery 50A is at a low temperature at a time of engine start, specifically if the temperature T of the first battery 50A is lower than the threshold X at a time of engine start (step S20: NO), the first switch SW1 is turned on to connect the two batteries 50A and 50B in parallel (step S40). However, the condition to determine whether or not to connect the two batteries 50A and 50B in parallel at the time of engine start is not limited to the temperature T of the first battery 50A, and another condition may be used if the condition is correlated with the temperature. For example, if the startability of the engine is likely to become low only with the first battery 50A when the engine is started, for example, if an internal resistance of the first battery 50A is greater than a predetermined threshold or if a battery voltage Va of the first battery 50A is lower than a predetermined threshold, the first switch SW1 may be turned on to connect the two batteries 50A and 50B in parallel.

(9) Further, the condition to determine whether or not to connect the two batteries 50A and 50B in parallel is not necessarily limited to a condition correlated with the temperature, and a condition correlated with, for example, deterioration of the battery may be used. For example, if the startability of the engine is likely to become low only with the first battery 50A when the engine is started, for example, if an increased amount of the internal resistance due to deterioration of the first battery 50A is greater than a predetermined threshold, the first switch SW1 may be turned on to connect the two batteries 50A and 50B in parallel.

The invention claimed is:

1. A power supply device for a vehicle comprising:
a first energy storage device having a first energy storage element;
a second energy storage device having a second energy storage element;
a switch configured to switch between: (1) an on-state in which the first energy storage device and the second energy storage device are connected in parallel and in which both the first energy storage device and the second energy storage device supply power, and (2) an off-state in which the first energy storage device and the second energy storage device are disconnected and not in parallel connection with each other; and
a switch controller,
wherein:
each of the first energy storage element and the second energy storage element is an energy storage element having an SOC-OCV characteristic having a flat region thereon, and
the switch controller is configured to switch the switch from the off-state to the on-state supplying power when each of the first energy storage element and the second energy storage element is in the flat region of the SOC-OCV characteristic and based upon a predetermined condition being satisfied at a predetermined time, the predetermined condition being one of either: (i) a predetermined temperature of the first energy storage element being lower than a first threshold; or (ii) an internal resistance of the first energy storage element being greater than a second threshold.

2. The power supply device for a vehicle according to claim 1, wherein:
the first energy storage device is connected to an engine starter device,
the predetermined time is a time of engine start, and
when the predetermined condition is satisfied at the time of engine start, the switch controller turns on the switch to connect the first energy storage device and the second energy storage device in parallel.

3. The power supply device for a vehicle according to claim 2, wherein the predetermined condition is further that a voltage value of the first energy storage element is lower than a threshold.

4. The power supply device for a vehicle according to claim 2, wherein:
the second energy storage device is connected to an electric load different from the engine starter device, and
when the predetermined condition is not satisfied at the time of engine start, the switch controller turns off the switch to disconnect the first energy storage device and the second energy storage device from each other.

5. The power supply device for a vehicle according to claim 1, wherein:
a type of a positive active material of the first energy storage element and a type of a positive active material of the second energy storage element are identical, and
a type of a negative active material of the first energy storage element and a type of a negative active material of the second energy storage element are identical.

6. The power supply device for a vehicle according to claim 5, wherein:
the positive active material comprises lithium iron phosphate, and
the negative active material comprises graphite.

7. The power supply device for a vehicle according to claim 1, wherein the first energy storage device and the second energy storage device have different actual capacities.

8. A power supply device for a vehicle comprising:
a first energy storage device having a first energy storage element;
a second energy storage device having a second energy storage element;
a switch configured to switch between: (1) a state in which the first energy storage device and the second energy storage device are connected in parallel and in which both supply power, and (2) a state in which the first energy storage device and the second energy storage device are disconnected and not in parallel connection with each other; and
a switch controller,
wherein:
each of the first energy storage element and the second energy storage element is an energy storage element having an SOC-OCV characteristic having a flat region thereon,
the first energy storage device is connected to an engine starter device,
when a predetermined condition is satisfied at a time of engine start, the switch controller is configured to turn on the switch to connect the first energy storage device and the second energy storage device in parallel, the predetermined condition being one of either: (i) a predetermined temperature of the first energy storage element being lower than a first threshold; or (ii) an internal resistance of the first energy storage element being greater than a second threshold, and the first energy storage device supplies a cranking current to the engine starter when the switch is turned on by the switch controller.

9. The power supply device for a vehicle according to claim 8, wherein the predetermined condition is further that a voltage value of the first energy storage element is lower than a threshold.

10. A power supply device for a vehicle comprising:
a first energy storage device having a first energy storage element;
a second energy storage device having a second energy storage element;
a switch configured to switch between: (1) an on-state in which the first energy storage device and the second energy storage device are connected in parallel and in which both the first energy storage device and the second energy storage device supply power, and (2) an off-state in which the first energy storage device and the second energy storage device are separated from each other; and
a switch controller,
wherein:
each of the first energy storage element and the second energy storage element is an energy storage element having an SOC-OCV characteristic having a flat region thereon,
the switch controller is configured to switch the switch from the off-state to the on-state supplying power when each of the first energy storage element and the second energy storage element is in the flat region of the SOC-OCV characteristic,
the first energy storage device is connected to an engine starter device,
the second energy storage device is connected to an electric load different from the engine starter device,
when a predetermined condition is satisfied at a time of engine start, the switch controller turns on the switch to connect the first energy storage device and the second energy storage device in parallel,
when the predetermined condition is not satisfied at a time of engine start, the switch controller turns off the switch to separate the first energy storage device and the second energy storage device from each other, and
wherein the predetermined condition being one of either:
(i) a predetermined temperature of the first energy storage element being lower than a first threshold; or
(ii) an internal resistance of the first energy storage element being greater than a second threshold.

\* \* \* \* \*